US012207117B2

(12) United States Patent
Meingast et al.

(10) Patent No.: US 12,207,117 B2
(45) Date of Patent: *Jan. 21, 2025

(54) DETERMINATION OF USER PRESENCE AND ABSENCE USING WIFI CONNECTIONS

(71) Applicant: Google LLC, Mountain View, CA (US)

(72) Inventors: Marci Meingast, San Francisco, CA (US); Andrew Axley, Mountain View, CA (US); Daniele Midi, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,101

(22) Filed: Oct. 3, 2023

(65) Prior Publication Data

US 2024/0031847 A1 Jan. 25, 2024

Related U.S. Application Data

(63) Continuation of application No. 17/746,840, filed on May 17, 2022, now Pat. No. 11,818,599, which is a
(Continued)

(51) Int. Cl.
*H04W 4/00* (2018.01)
*G06N 20/00* (2019.01)
(Continued)

(52) U.S. Cl.
CPC ............ *H04W 24/08* (2013.01); *G06N 20/00* (2019.01); *H04W 84/12* (2013.01)

(58) Field of Classification Search
CPC ....... H04B 17/27; G01S 5/021; G01S 5/0242; G01S 11/026; G08B 19/00; G08B 25/008;
(Continued)

(56) References Cited

U.S. PATENT DOCUMENTS 6,259,405 B1 7/2001 Stewart et al.
7,876,724 B2 * 1/2011 Hi Sim ................. H04W 48/08
370/328
(Continued)

FOREIGN PATENT DOCUMENTS

CN 1640057 7/2005
CN 102907121 A 1/2013
(Continued)

*Primary Examiner* — Frank Duong
(74) *Attorney, Agent, or Firm* — Kilpatrick Townsend & Stockton LLP

(57) ABSTRACT

Systems and techniques are provided for determination of user presence and absence using WiFi connections. Reports may be received from WiFi access points in an environment. The reports may include an identifier of a WiFi device, an indication of a connection to or disconnection from a WiFi access point, a time of the connection or disconnection, and an identifier of the WiFi access point. A connection sequence for the WiFi device may be generated from the reports. Whether the WiFi device is present in or absent from the environment as of a specified time may be determined based on the connection sequence. An indication of presence for a user associated with the WiFi device may generated if the WiFi device is present in the environment. An indication of absence for the user associated with the WiFi device may be generated if the WiFi device is absent from the environment.

20 Claims, 8 Drawing Sheets

Related U.S. Application Data continuation of application No. 16/864,015, filed on Apr. 30, 2020, now Pat. No. 11,337,091.

(51) Int. Cl.
*H04W 24/08* (2009.01)
*H04W 84/12* (2009.01)

(58) Field of Classification Search
CPC ....... G06N 20/00; H04L 9/0637; H04L 12/28; H04L 29/08684; H04L 29/08945; H04L 51/043; H04L 67/1002; H04L 67/18; H04L 67/22; H04L 67/24; H04L 67/54; H04M 3/42348; H04W 4/02; H04W 4/021; H04W 4/029; H04W 8/08; H04W 16/18; H04W 24/08; H04W 52/0225; H04W 60/04; H04W 76/11; H04W 84/12
See application file for complete search history.

(56) References Cited

U.S. PATENT DOCUMENTS

| | | | |
|---|---|---|---|
| 8,571,578 | B1 | 10/2013 | Chen et al. |
| 9,584,335 | B1* | 2/2017 | Malasani ............ H04L 12/2816 |
| 9,756,387 | B2* | 9/2017 | Rowe ............... H04N 21/44218 |
| 10,187,754 | B1* | 1/2019 | Hansen ................ H04L 9/3297 |
| 10,327,107 | B2* | 6/2019 | Rehman .................... G01S 5/02 |
| 10,621,840 | B2* | 4/2020 | Garg ................. G08B 21/0415 |
| 11,092,682 | B1* | 8/2021 | Meingast ................. G01S 5/021 |
| 11,337,091 | B2 | 5/2022 | Meingast et al. |
| 11,605,027 | B2* | 3/2023 | Rosen ................ H04L 43/0876 |
| 11,818,599 | B2 | 11/2023 | Meingast et al. |
| 2001/0053214 | A1* | 12/2001 | Kleinoder ........... H04M 7/0048 379/207.04 |
| 2002/0021307 | A1* | 2/2002 | Glenn ...................... H04L 51/04 715/753 |
| 2002/0065894 | A1* | 5/2002 | Dalal ...................... H04L 51/56 709/204 |
| 2005/0021773 | A1* | 1/2005 | Shiga ...................... H04L 67/52 709/228 |
| 2005/0265296 | A1* | 12/2005 | Zhang ...................... H04W 4/02 370/338 |
| 2013/0237204 | A1* | 9/2013 | Buck ........................ G01S 19/16 455/418 |
| 2013/0262184 | A1* | 10/2013 | Jain ....................... H04W 4/029 705/7.34 |
| 2017/0207927 | A1* | 7/2017 | Williams ............... H04W 4/029 |
| 2018/0121493 | A1 | 5/2018 | Pallas |

FOREIGN PATENT DOCUMENTS

| | | |
|---|---|---|
| CN | 105792118 | 7/2016 |
| CN | 106465152 | 2/2017 |
| CN | 107771399 A | 3/2018 |
| CN | 110622588 | 12/2019 |
| JP | 2006505977 | 2/2006 |
| JP | 2014241509 | 12/2014 |
| JP | 2018085700 | 5/2018 |
| JP | 2018196092 | 12/2018 |
| JP | 2019186693 | 10/2019 |
| KR | 20150100523 A | 9/2015 |
| KR | 20180008503 A | 1/2018 |
| KR | 20200075812 A | 6/2020 |
| KR | 20230003021 A | 1/2023 |

\* cited by examiner

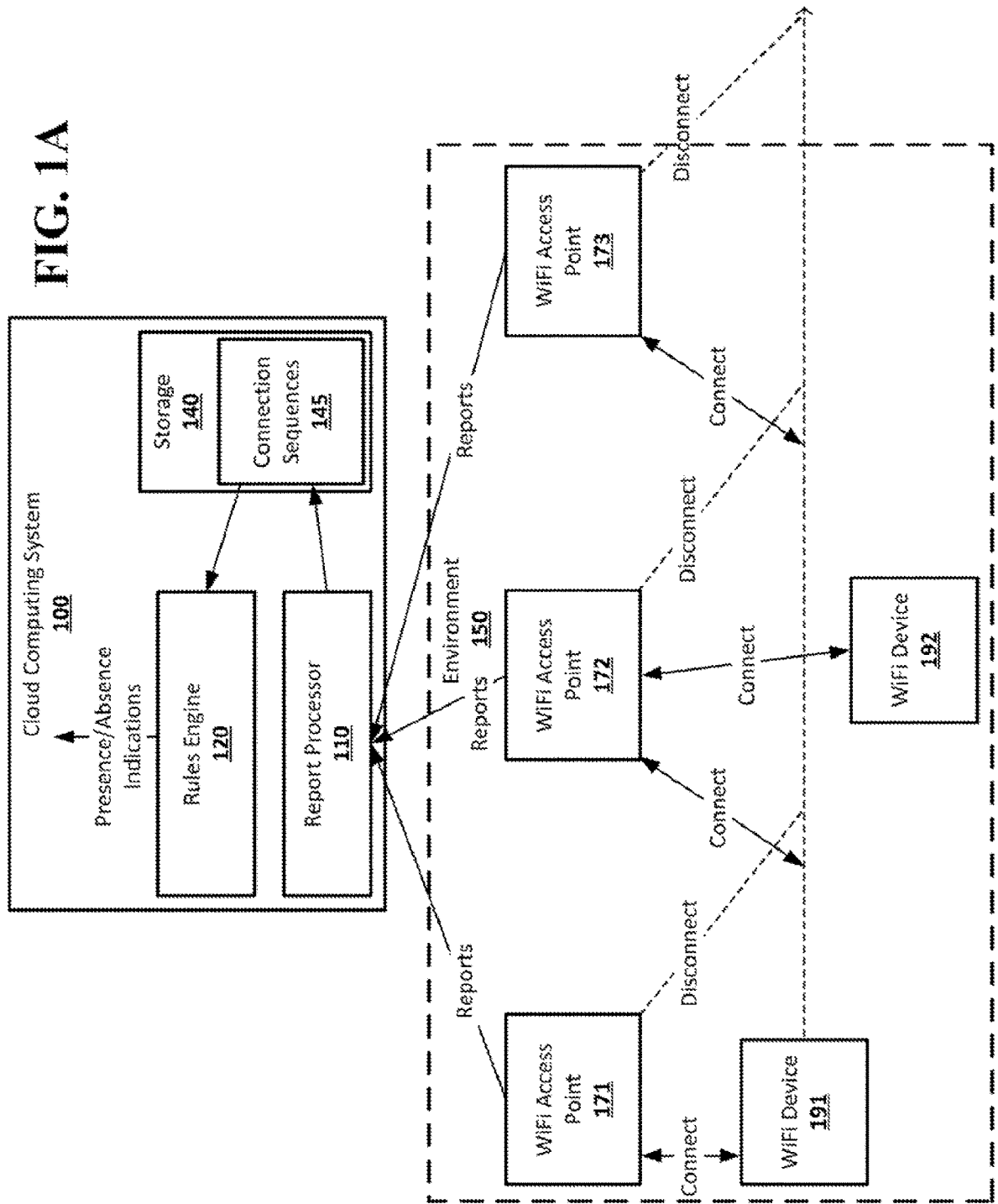

DETERMINATION OF USER PRESENCE AND ABSENCE USING WIFI CONNECTIONS

CROSS-REFERENCE TO RELATED APPLICATIONS

This application is a continuation of U.S. patent application Ser. No. 17/746,840, filed May 17, 2022, entitled "DETERMINATION OF USER PRESENCE AND ABSENCE USING WIFI CONNECTIONS," which is continuation of U.S. patent application Ser. No. 16/864,015, filed Apr. 30, 2020, entitled "DETERMINATION OF USER PRESENCE AND ABSENCE USING WIFI CONNECTIONS". The entire disclosure of all of the aforementioned U.S. Patent Applications are hereby incorporated by reference, for all purposes, as if fully set forth herein.

BACKGROUND

It may be useful to be able to determine peoples' presence in or absence from an environment, such as a home, office, or other structure. The environment may include devices and systems that may be automated and may operate based on the presence or absence of individuals within the environment.

BRIEF SUMMARY

According to an embodiment of the disclosed subject matter, reports may be received from WiFi access points in an environment. The reports may include an identifier of a WiFi device, an indication of a connection to or disconnection from one of the WiFi access points, a time of the connection or disconnection, and an identifier of the one of the WiFi access points. A connection sequence for the WiFi device may be generated from the reports. The connection sequence may include times of connections to and times of disconnections from the WiFi access points by the WiFi device. Whether the WiFi device is present in the environment or absent from the environment as of a specified time may be determined based on time periods of connection to any of the WiFi access points and time periods of disconnection from all of the WiFi access points in the connection sequence. An indication of presence for a user associated with the WiFi device may be generated if it is determined that the WiFi device is present in the environment or an indication of absence may be generated for the user associated with the WiFi device if it is determined that the WiFi device is absent from the environment.

A control signal may be generated for a controllable device in the environment based on the indication of presence or the indication absence. The control signal may be sent to the device to be implemented by the device.

Whether the WiFi device is present in the environment or absent from the environment as of a specified time may be determined based on time periods of connection to the WiFi access points and time periods of disconnection from the WiFi access points in the connection sequence by determining that the WiFi device is present in the environment if the amount of time between the start of one of the time periods of connection to any of the WiFi access points and the specified time is greater than a first threshold amount of time and the one of the time periods of connection includes the specified time, or if a total amount of time between the start of a first of two or more consecutive time periods of connection to any of the WiFi access points and the specified time is greater than the first threshold and a last of the two or more consecutive time periods includes the specified time.

Whether the WiFi device is present in the environment or absent from the environment as of a specified time may be determined based on time periods of connection to the WiFi access points and time periods of disconnection from the WiFi access points in the connection sequence by determining that the WiFi device is absent from the environment if an amount of time between the start of one of the time periods of disconnection from all of the WiFi access points is greater than a second threshold amount of time and the one of the time periods of disconnection includes the specified time.

The identifier of the WiFi device may be a salted hashed media access control address (SHMAC).

Before whether the WiFi device is present in the environment or absent from the environment as of a specified time is determined based on time periods of connection to any of the WiFi access points and time periods of disconnection from all of the WiFi access points in the connection sequence, a connection time data, connects/disconnects count data, transition data, and connection/disconnection length data for the WiFi device may be generated from the reports, sensor and device data may be received from sensors or devices in the environment, and a WiFi device indication indicating that the WiFi device should be used to determine the presence in or absence from the environment of the user associated with the WiFi device may be generated with a machine learning system, where the connection time data, the connects/disconnects count data, the transition data, and the connection/disconnection length data for the WiFi device and the sensor and device data are input to the machine learning system.

Additional reports may be received from the WiFi access points in the environment. The additional reports may include an identifier of a second WiFi device, an indication of a connection to or disconnection from one of the WiFi access points, a time of the connection or disconnection, and an identifier of the one of the WiFi access points. Second connection time data, second connects/disconnects count data, second transition data, and second connection/disconnection length data for the second WiFi device may be generated from the additional reports. A second WiFi device indication indicating that the second WiFi device should not be used to determine the presence in or absence from the environment of a second user associated with the second WiFi device may generated with the machine learning system, where second connection time data, the second connects/disconnects count data, the second transition data, and the second connection/disconnection length data for the second WiFi device and the sensor and device data are input to the machine learning system.

Device data may be received from the WiFi device. The device data may be input to the machine learning system. The device data may include geolocation data for the WiFi device and/or geofence data for the WiFi device.

According to an embodiment of the disclosed subject matter, a means for receiving, from WiFi access points in an environment, reports, wherein each of the reports includes an identifier of a WiFi device, an indication of a connection to or disconnection from one of the WiFi access points, a time of the connection or disconnection, and an identifier of the one of the WiFi access points, a means for generating, from the reports, a connection sequence for the WiFi device, wherein the connection sequence includes times of connections to and times of disconnections from the WiFi access points by the WiFi device, a means for determining, based on time periods of connection to any of the WiFi access points and time periods of disconnection from all of the WiFi access points in the connection sequence, whether the WiFi device is present in the environment or absent from the environment as of a specified time, a means for generating an indication of presence for a user associated with the WiFi device if it is determined that the WiFi device is present in the environment or generating an indication of absence for the user associated with the WiFi device if it is determined that the WiFi device is absent from the environment, a means for generating a control signal for a controllable device in the environment based on the indication of presence or the indication absence, a means for sending the control signal to the device to be implemented by the device, a means for determining that the WiFi device is present in the environment if the amount of time between the start of one of the time periods of connection to any of the WiFi access points and the specified time is greater than a first threshold amount of time and the one of the time periods of connection includes the specified time, or if a total amount of time between the start of a first of two or more consecutive time periods of connection to any of the WiFi access points and the specified time is greater than the first threshold and a last of the two or more consecutive time periods includes the specified time, a means for determining that the WiFi device is absent from the environment if an amount of time between the start of one of the time periods of disconnection from all of the WiFi access points is greater than a second threshold amount of time and the one of the time periods of disconnection includes the specified time, a means for generating, from the reports, a connection time data, connects/disconnects count data, transition data, and connection/disconnection length data for the WiFi device, a means for receiving, from one or more sensors or devices in the environment, sensor and device data, a means for generating, with a machine learning system, a WiFi device indication indicating that the WiFi device should be used to determine the presence in or absence from the environment of the user associated with the WiFi device, wherein the connection time data, the connects/disconnects count data, the transition data, and the connection/disconnection length data for the WiFi device and the sensor and device data are input to the machine learning system, a means for receiving, from the WiFi access points in the environment, additional reports, wherein each of the additional reports includes an identifier of a second WiFi device, an indication of a connection to or disconnection from one of the WiFi access points, a time of the connection or disconnection, and an identifier of the one of the WiFi access points, a means for generating, from the additional reports, second connection time data, second connects/disconnects count data, second transition data, and second connection/disconnection length data for the second WiFi device, a means for generating, with the machine learning system, a second WiFi device indication indicating that the second WiFi device should not be used to determine the presence in or absence from the environment of a second user associated with the second WiFi device, wherein the second connection time data, the second connects/disconnects count data, the second transition data, and the second connection/disconnection length data for the second WiFi device and the sensor and device data are input to the machine learning system, and a means for receiving device data from the WiFi device, wherein the device data is input to the machine learning system, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1A shows an example system and arrangement suitable for determination of user presence and absence using WiFi connections according to an implementation of the disclosed subject matter.

DETAILED DESCRIPTION

Figure 1B:
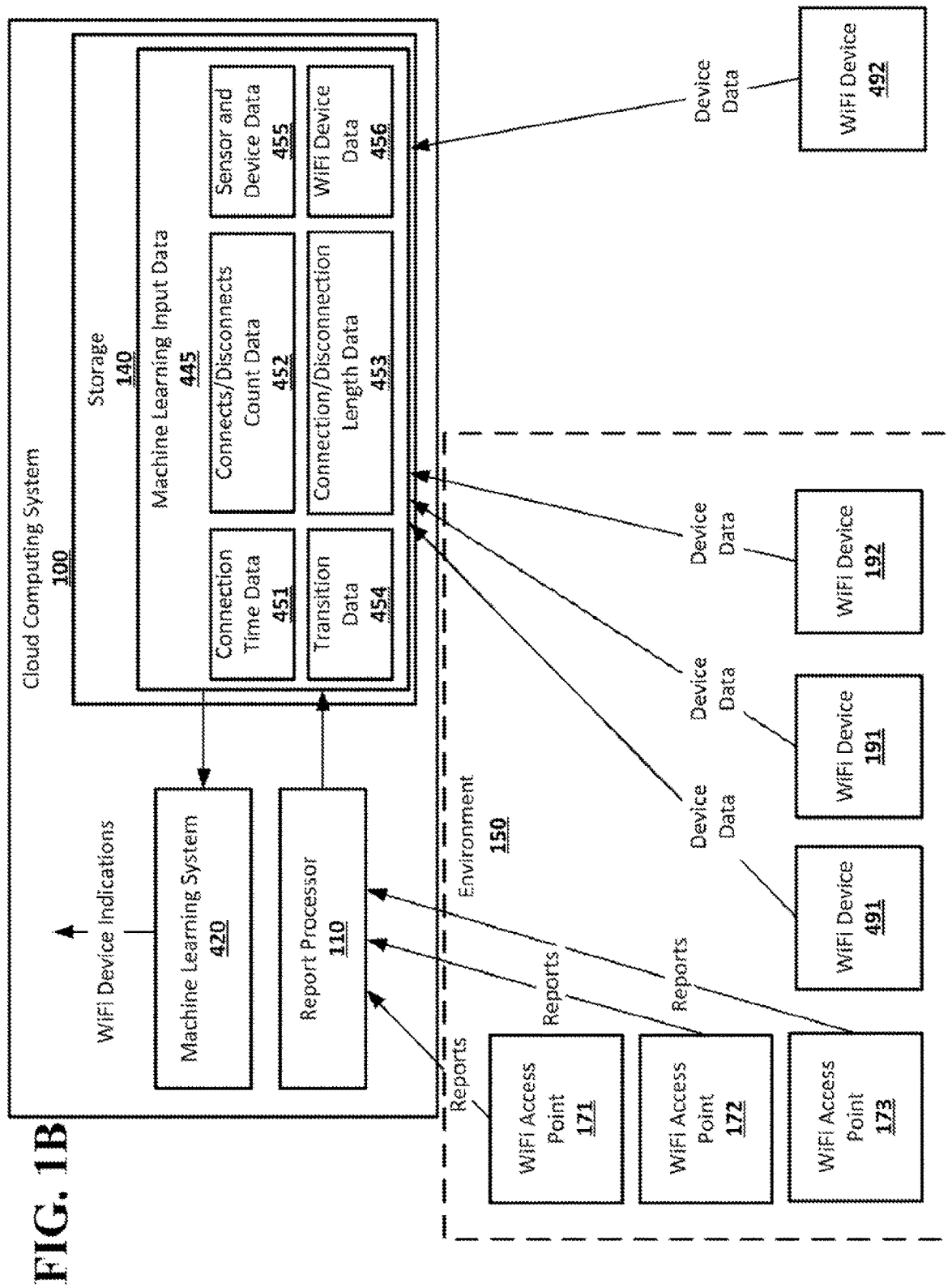
FIG. 1B shows an example system and arrangement suitable for determination of user presence and absence using WiFi connections according to an implementation of the disclosed subject matter.

According to embodiments disclosed herein, determination of user presence and absence using WiFi connections may allow connections to and disconnections from WiFi access points in the same environment by a WiFi device to be used to determine the presence in or absence from the environment of a user associated with that WiFi device. WiFi access points in the environment may send, to a cloud computing system, reports that include the times of connections and disconnections by a WiFi device. The cloud computing system may collate reports for the WiFi device, using the times of connections and disconnections from the WiFi access points to determine time periods during which the WiFi device is connected to and disconnected from the WiFi access points. The cloud computing system may apply rules to the time periods of connection and disconnection to determine whether the time periods indicate the presence in or absence from the environment of the WiFi device and its associated user as of the time the rules are applied. Connections to and disconnections from the WiFi access points in the same environment by the WiFi device may be used in conjunction with signals from other devices in the environment to determine whether to use the connections to and disconnections from the WiFi access points by that WiFi device to determine the presence in or absence from the environment of the user associated with that WiFi device.

An environment may include a number of WiFi access points. The environment may be, for example, a structure, such as, for example, a home, office, apartment, or other structure, and may include a combination of enclosed and open spaces. The WiFi access points may be distributed throughout the environment, and may, for example, form a mesh network or a hub-and-spoke network. The WiFi access points may provide WiFi devices that connect to the WiFi access points with access to local area network (LAN), and to a wide area network (WAN), such as the Internet. Access to a WAN may be provided through any suitable wired or wireless WAN connection that the WiFi access points may have access to, for example, through a connection to a wired or wireless modem.

The ranges over which the WiFi access points may be able to broadcast and receive WiFi signals may include areas of overlap, resulting in areas of the environment where a WiFi device may be able to connect to more than one of the WiFi access points. For example, a house may have three floors, and may include a single WiFi access point located on each floor. A WiFi device in a specific area on the first floor may be able to connect to either of the WiFi access points on the first floor and the second floor of the house.

A WiFi device may connect to and disconnect from the WiFi access points in the environment. The WiFi device may be any suitable device that includes WiFi radios that allow the WiFi device to connect to WiFi networks, such as, for example, a phone, tablet, laptop, watch or other wearable device, or WiFi enabled tracking tag. As the WiFi device moves within the environment, and enters and exits the environment, the WiFi device may connect to and disconnect from the different WiFi access points throughout the environment depending on the location of the WiFi device and the ranges of the WiFi access points. For example, a WiFi device may start on the third floor of a house and connect to a WiFi access point on that floor. The WiFi device may move to the second floor of the house, disconnect from the WiFi access point on the third floor and connect to a WiFi access point on the second floor. The WiFi device may move to the first floor of the house, disconnect from the WiFi access point on the second floor and connect to a WiFi access point on the first floor. The WiFi device may exit the house and disconnect from the WiFi access point on the first floor. The WiFi device may later re-enter the house and connect to the WiFi access point on the first floor.

The WiFi access points in an environment may report connections to and disconnections from the WiFi access points by the WiFi device. The connections and disconnections may be reported to, for example, a cloud computing system, which may be remote from the environment, through an Internet connection. The WiFi access points may report the connections and disconnections of the WiFi device in real-time. For example, a WiFi access point on the third floor of a house may report to the cloud computing system the connection of the WiFi device upon the connection being successfully established, and may report the disconnection of the WiFi device upon detecting the disconnection. Detection by the WiFi access point of the disconnection of the WiFi device may be delayed from the actual disconnection as it occurs on the WiFi device.

Reports of connections and disconnections of the WiFi device sent to the cloud computing system may include any suitable data, including an identifier for the WiFi device, an identifier for the WiFi access point, an indication of whether the report is for a connection or a disconnection, and the time at which the WiFi access point detected the connection or disconnection. The identifier for the WiFi access point may be any suitable identifier that may allow the cloud computing system to distinguish reports from different WiFi access points in the same environment. The identifier for a WiFi access point may, for example, be based on a MAC address of a component of the WiFi access point, or may be an identifier assigned to the WiFi access point by a user.

The identifier for the WiFi device may be a privacy preserving identifier that may allow the cloud computing system to distinguish reports for the WiFi device from reports for other WiFi devices, but may not allow for positive identification of the WiFi device itself or of the user of the WiFi device. For example, the identifier may be based on a media access control (MAC) address of the WiFi device, for example, a salted hashed MAC (SHMAC) generated when the user opts-in to allow the cloud computing system to receive reports from the WiFi access points in the environment. The SHMAC for the WiFi device may be generated by, for example, the WiFi access points, and may be sent to the cloud computing system in reports for the WiFi device. The user may also enter the SHMAC, or any other suitable identifier for the WiFi device, directly to the WiFi access points or the cloud computing system. The SHMAC may allow for all reports received by the cloud computing system that include the same SHMAC to be considered to be reports for the same WiFi device, but may not allow the cloud computing system to identify the WiFi device, for example, by determining its MAC address or other such identifiers that can be used to identify a physical WiFi device.

A user may specify the WiFi devices that the cloud computing system should use when determining users' presence in or absence from the environment. The specified WiFi devices may be considered to act as indicators of the presence or absence of the users of the WiFi devices in the environment. The WiFi access point may only send reports for the specified WiFi devices to the cloud computing system, or may send reports for all WiFi devices to the cloud computing system. The cloud computing system may receive an identifier for each specified WiFi device, which may allow the cloud computing system to determine which reports belong to which WiFi devices, but not to identify any of the physical WiFi devices. Similarly, the cloud computing system may not be able to identify individual users of the WiFi devices. Each separate WiFi device may be considered to be associated with a separate user, but there may be no explicit identification of the users to the cloud computing system. The presence or absence of a WiFi device may be considered indicative of the presence or absence of a user associated with that WiFi device.

The WiFi access points may also update previously sent reports of connections and disconnections. For example, a WiFi access point may detect that a WiFi device has disconnected when the WiFi device has not sent data to the WiFi access point for a period of time. In some cases, the WiFi device may still be connected to the WiFi access point and may begin sending data to the WiFi access point after the WiFi access point has already reported a disconnection to the cloud computing system. The WiFi access point may update the report to indicate that the WiFi device was not disconnected during the time period between the report of the disconnection and the update to the report.

The cloud computing system may use the reports of connections and disconnections by WiFi devices received from the WiFi access points within an environment to determine the presence in or absence from the environment of users of the WiFi devices. The cloud computing system may collate reports that have the identifier for the same WiFi device. The cloud computing system may use the times for connections and disconnections in the reports to determine the time periods for which the WiFi device is connected to each of the WiFi access points in the environment, and any time periods during which the WiFi device is not connected to any WiFi access point in the environment. This may generate a connection sequence for the WiFi device. The cloud computing system may then apply rules to the time periods in the connection sequence to determine whether the user of the WiFi device is present in or absent from the environment as of the time the rules are applied to the connection sequence. For example, if a WiFi device is connected to a single WiFi access point in the environment for a period of time that exceeds a first threshold period of time, the cloud computing system may determine that a user associated with the WiFi device was present in the environment during that period of time. If a WiFi device is not connected to a single WiFi access point in the environment for a period of time that exceeds the first threshold period of time, the combined amount of time the WiFi device has been connected to any WiFi access point in the environment may be determined. If the combined amount of time exceeds the first threshold period of time, the cloud computing system may determine that a user associated with the WiFi device was present in the environment during that period of time. If a WiFi device does not connect to any of the WiFi access points in the environment for an amount of time that exceeds a second threshold period of time after disconnecting from one of the WiFi access points, then the cloud computing system may determine that the user associated with the WiFi device is absent from the environment. The first and second threshold periods of time may any suitable lengths of time, determined in any suitable manner.

If a WiFi device is rapidly connecting to and disconnecting from a WiFi access point, debouncing may be used. Debouncing may remove multiple reports generated in rapid succession that may indicative of a WiFi device that is at the edge of the range of a WiFi access point, bouncing back and forth between being connected and disconnected. For example, when a WiFi device is at the edge of the range of a WiFi access point, the WiFi device may repeatedly connect to and disconnect from that WiFi access point, causing the WiFi access point to repeatedly generate reports of the connections and disconnections. The cloud computing system may debounce by, for example, ignoring reports from a WiFi access point when the reports have the identifier for the same WiFi device and times for disconnects and reconnects that are too close together, for example are separated by a period of time below some small threshold that may be indicative of WiFi device on the edge of the range of the WiFi access point.

The cloud computing system may make a separate determination of presence or absence based on each separate WiFi device for which the cloud computing system receives reports. For example, if the cloud computing system receives reports for two different WiFi devices, with two different SHMACs, from the WiFi access points in an environment, the cloud computing system may determine presence or absence for the two separate WiFi devices and their associated users. The determination for the first WiFi device may be made based on reports that include a first of the two different SHMACs, and the determination for the second WiFi device may be made based on reports that include a second of the two different SHMACs.

The cloud computing system may update the determinations of presence or absence at any suitable times. For example, the cloud computing system may update the determination of presence or absence made based on reports for a WiFi device whenever a new report for that WiFi device is received from the WiFi access points, or retroactively whenever a previous report for that WiFi device is updated. This may allow the cloud computing system to maintain both determinations of presence or absence that are current, and to adjust previously made determination retroactively so that a record of presences and absences kept over time may be more accurate.

The cloud computing system may use the determined presence or absence of users based on their associated WiFi devices in any suitable manner. For example, the environment may include controllable devices, such as lights, sensors, security devices, locks, A/V devices, HVAC systems, and motorized devices such as blinds, which may be controlled from the cloud computing system directly or through a computing device, such as a hub computing device, located in the environment. The cloud computing system may generate control signals to control controllable devices based on the users determined to be present in and absent from the environment, or may send the determinations of presence and absence to a computing device in the environment, which may use them to generate control signals for the controllable devices.

In some implementations, instead of the user telling the cloud computing system which WiFi devices to use to determine the presence or absence of users, the cloud computing system may determine which WiFi devices to use based on the connections to and disconnections from the WiFi access points in the same environment and signals from other devices in the environment. The connections and disconnection of some WiFi devices in an environment may not be good indicators of whether a user is present in or absent from the environment. For example, some WiFi devices may be primarily stationary, such as desktop computers, televisions with built-in WiFi, game consoles, and other WiFi enabled appliances and A/V electronics and appliances. These WiFi devices may remain connected to a single WiFi access point most of the time, and may not be useful in determining whether a user associated with these WiFi devices is present in or absent from the environment. Some WiFi devices, such as, for example, laptops and tablets, may move around the environment, connecting to and disconnecting from different WiFi access points within the environment, but may only occasionally, or never, leave the environment, which may make them less useful in determining if a user is absent from the environment. Additionally, some WiFi devices may enter and leave the environment, but may do so occasionally, as they may belong to guests of the environment.

The WiFi access points may send reports to the cloud computing system for all WiFi devices that connect to and disconnect from the WiFi access points. The WiFi devices may be identified using a privacy-preserving identifier, such as, for example, SHMACs determined for the WiFi devices by the WiFi access points. The cloud computing system may only know the SHMACs of the WiFi devices, and may not receive any other identifying data for the WiFi devices from the reports of the WiFi access points.

The cloud computing system may use the reports from the WiFi access points to determine data regarding the connections to and disconnections from WiFi access points by the various WiFi devices. The cloud computing system may, for example, determine, for each WiFi device for which reports are received, the numbers of connections and disconnections for that WiFi device over a set period of time, such as, for example, a 24-hour period. The cloud computing system may, for example, determine for each WiFi device for which reports are received, the spans of time the WiFi device is connected to any WiFi access point in the environment and similarly, the spans of time the WiFi device is not connected to any WiFi access point in the environment. The cloud computing system may, for example, determine, for each WiFi device for which reports are received, the number of different WiFi access points in the environment that the WiFi device connects to over a set period of time, and the number of transitions the WiFi device makes between WiFi access points in the environment. The cloud computing system may, for example, determine, for each WiFi device for which reports are received, separate amounts of time the WiFi device is connected to each WiFi access point.

The cloud computing system may also receive data from other devices within the environment. The environment may, for example, include a hub computing device. The hub computing device may be any suitable computing device for managing sensors and other systems, such as automation systems, within the environment. The hub computing device may be, for example, a controller for an environment. For example, the hub computing device may be or include a thermostat, security hub, or other computing device located within the environment. The hub computing device also may be another device within the environment or may be a separate computing device dedicated to managing the environment that may be connected to devices in the environment through, for example, the Internet. The hub computing device may be connected, through any suitable wired, wireless, local, and wide area connections, to a number of sensors and controllable devices distributed throughout an environment or structure. For example, the hub computing device, sensors, and other components of the environment may be connected in a mesh network. Some of the sensors may, for example, be motion sensors, including passive infrared sensors used for motion detection, light sensors, cameras, microphones, entryway sensors, light switches, as well as mobile device scanners that may use Bluetooth, WiFi, RFID, or other wireless devices as sensors to detect the presence of devices such as phones, tablets, laptops, or fobs. Sensors may be distributed individually or may be combined with other sensors in sensor devices. For example, a sensor device may include a low power motion sensor and a light sensor, or a microphone and a camera, or any other combination of available sensors.

The hub computing device may receive signals including data from sensors and other devices throughout the environment and send data from the signals to the cloud computing system. The data may include, for example, open/close events detected by sensors that monitor external doors of the environment and motions detected by motion sensors that monitor areas around the external doors of the environment, data indicating when devices, including lights, appliances, and A/V equipment, have been turned on or off based on input from a user, rather than through automated control by the hub computing device or cloud computing system, and any other suitable data that may be indicative of whether a user is present in, absent from, entering, or leaving, the environment. In some implementations, the data from the sensors and other devices may be sent to the cloud computing system through the WiFi access points directly, as the hub computing device may be wholly part of the cloud computing system with computational capacity located off-site from the environment.

The cloud computing system may receive other data directly from the WiFi devices. For example, a WiFi device may be permitted by its user to transmit geolocation data, and data determined using geolocation data, to the cloud computing system. The geolocation data may be obtained by the WiFi device in any suitable manner, including through use of Global Position System (GPS) radio, or through cellular or WiFi triangulation. The geolocation data may be used, for example, for geofencing. The WiFi device, or the cloud computing system, may use the geolocation data for the WiFi device to determine when the WiFi device has crossed a geofence, entering or exiting the area ringed by the geofence. The geofence may be, for example, a geofence around the environment, so that an exit crossing of the geofence by a WiFi device may indicate that the WiFi device, and a user associated with the WiFi device, has exited the environment. The data received directly from the WiFi device may be transmitted through the WiFi access points in the environment, WiFi access points outside of the environment, or through other data connections, such as a cellular data connection.

In some implementations, the cloud computing system may also receive reports of connections and disconnections by a Bluetooth radio of device from WiFi access points that have Bluetooth radios. For example, a tracking tag may include a Bluetooth radio that may connect to and disconnect from the Bluetooth radio of the WiFi access points in the environment as the tracking tag moves through the environment.

The cloud computing system may use the determined data regarding the connections to and disconnections from WiFi access points by the various WiFi devices, the data received from other devices and sensors in the environment, and data received directly from the WiFi devices such as geolocation data, to determine which WiFi devices to use to determine users' presence in or absence from the environment. For example, the cloud computing system may include a machine learning system. The machine learning system may be any suitable machine learning system, such as, for example, an artificial neural network such as deep learning neural networks, a Bayesian network, support vector machine, classifier of any type, or any other suitable statistical or heuristic machine learning system type. The machine learning system may be a trained machine learning system that may have undergone supervised or unsupervised offline training, or may be a machine learning system that uses supervised or unsupervised online learning.

The determined data regarding the various WiFi devices' connections to and disconnections from WiFi access points, the data received from other devices and sensors in the environment, and data received directly from the WiFi devices such as geolocation data, may be used by the cloud computing system as input data to the machine learning system. The machine learning system may generate and output data that may include indications of the WiFi devices that the cloud computing system should use to determine the presence in or absence from the environment of users of the WiFi devices.

The input data may be input to the machine learning system in any suitable manner. For example, the input data may be partitioned by WiFi device, so that a first set of input data includes data regarding a first WiFi device and not any other WiFi devices, and results in output data that regards only the first WiFi device, while a second set of input may include data regarding a second WiFi device and not any other WiFi devices, and results in output data that regards only the second WiFi device. The output data may, for example, be a probability that the WiFi device will be useful for the cloud computing system in determining the presence in or absence from the environment of any user of the WiFi device, for example, a specific user of the WiFi device or a group of users that may be possible user's of the WiFi device, or a binary indication of whether or not the cloud computing should use the WiFi device to determine any user's presence in or absence from the environment.

For example, the cloud computing system may receive reports from the WiFi access points in the environment for two WiFi devices, identified by SHMACs. The first WiFi device may be, for example, a phone, and the second WiFi device may be, for example, a laptop, though the cloud computing system may be unaware of the type of each of the WiFi devices, as the reports may only identify the WiFi devices by SHMAC. The cloud computing system may determine data regarding the connections to and disconnections from WiFi access points by the phone and the laptop. The cloud computing system may also receive data from other devices and sensors in the environment, and may receive data directly from the phone and the laptop which may be identified only by the SHMACs of the devices. The cloud computing system may first input the data determined for the phone from the WiFi access points reports for the phone, along with any data received directly from the phone and data from the other devices and sensors in the environment, to the machine learning system. The machine learning system may output an indication of whether the phone should be used by the cloud computing system to determine the presence in or absence from the environment of a user associated with the phone. The indication may be, for example, a probability that may indicate a level of confidence that the phone should be used, or a binary yes/no indication of whether the phone should be used. The cloud computing system may then input the data determined for the laptop, along with any data received directly from the laptop and data from the other devices and sensors in the environment, to the machine learning system, which may output an indication of whether the laptop should be used by the cloud computing system to determine the presence in or absence from the environment of a user associated with the laptop.

The input data may also include data for any number of the WiFi devices. This may result in the machine learning system generating output data that may be, for example, a vector of probabilities or binary indications regarding whether to use any of the WiFi devices to determine users' presence in or absence from the environment. The output data from the machine learning system may identify any WiFi devices by SHMAC. For example, the input data may include data for both the phone and the laptop, and the machine learning system may output a vector that includes two values, one indicating whether the phone should be used by the cloud computing system to determine the presence in or absence from the environment of a user associated with the phone, and the other indicating whether the laptop should be used by the cloud computing system to determine the presence in or absence from the environment of a user associated with the laptop. The values in the vector may be, for example, probabilities or binary indicators.

The input data may be input to the machine learning system at any suitable time. For example, the cloud computing system may update the input data anytime a new report for any WiFi device is received from any of the WiFi access points, new data is received from any sensor or device in the environment, or new data is received directly from any of the WiFi devices. The cloud computing system may use the updated input data as input to the machine learning system immediately after any update, or after some set number of updates to the input data. The cloud computing system may also input the input data to the machine learning system based on timed intervals, such as, for example, once every hour. Output data from the machine learning system based on updated input data may be used to update which WiFi devices are used by the cloud computing system to determine users' presence in or absence from the environment. For example, if a user replaces their old phone with a new phone, updates to the input data may show reports of connections and disconnections by the new phone while the old phone never reconnects after the report of its last disconnection. The output data from the machine learning system based on this updated input data may indicate that that the new phone should be used to determine users' presence in or absence from the environment and that the old phone should no longer be used.

In some implementations, the WiFi access points may transmit signals to the cloud computing system to indicate that the WiFi access points are turned on and active. The signals may be, for example, heartbeat reports that may be sent at specified intervals while a WiFi access point is on and active. When a heartbeat report is not received from a WiFi access point for some period of time, the WiFi access point may be considered to be off or inactive. Connection sequences for WiFi devices that were connected to the WiFi access point at the time the WiFi access point is first considered to be off or inactive may be updated to indicate that the connections to that WiFi access point should not be used by the machine learning system. The machine learning system may output presence or absence indications based on any other available data. If too many WiFi access points are considered off or inactive, the machine learning system may output an "unknown" presence or absence indication, indicating that not enough data is available to make a determination of presence or absence for a WiFi device.

In some implementations, the machine learning system may be part of the hub computing device for the environment. The reports from the WiFi access points, the data from devices and sensors in the environment, and the data received directly from WiFi devices may all be received by the hub computing device. Only the reports from the WiFi access points for WiFi devices that are already being used to determine users' presence in or absence from the environment may be sent to the cloud computing system. The hub computing device may determine the data regarding the connections to and disconnections from WiFi access points by the various WiFi devices, and may use the determined data along with the data received from other devices and sensors in the environment, and data received directly from the WiFi devices, as input data for the machine learning system. The output data from the machine learning system, indicating which WiFi devices to use to determine users' presence in or absence from the environment, may be used by the hub computing device to control which reports the WiFi access points send to the cloud computing system.

FIG. 1A shows an example system suitable for determination of user presence and absence using WiFi connections according to an implementation of the disclosed subject matter. A cloud computing system 100 may include a report processor 110, rules engine 120, and storage 140. The cloud computing system 100 may be any suitable computing device or system, such as, for example, a computer 20 as described in FIG. 9, for implementing the report processor 110, the rules engine 120, and the storage 140. The cloud computing system 100 may be, for example, a server system that provides cloud computing services using any suitable combinations of computing devices connected in any suitable manner distributed over any area. The report processor 110 may be any suitable combination of hardware or software for receiving reports from WiFi access points and processing the reports to generate connection sequences 145. The rules engine 120 may be any suitable combination of hardware and software for applying rules to connection sequences 145 to generate presence/absence indications. The storage 140 may be any suitable combination of hardware and software for implementing volatile and non-volatile storage, and may store the connection sequences 145.

An environment 150 may include WiFi access points 171, 172, and 173. The environment 150 may be, for example, a structure, such as a home or office, and may include a combination of indoor and outdoor spaces. The WiFi access points 171, 172, and 173 may be any suitable devices for creating a WiFi LAN that devices with WiFi may connect to. The WiFi access points 171, 172, and 173 may form a mesh network, or may be part of a hub-and-spoke network, and may connect to a WAN, such as the Internet, for example, through a wired or wireless modem connected to one or more of the WiFi access points 171, 172, and 173 through any suitable wired or wireless connection.

WiFi devices 191 and 192 may be, for example, smartphones, tablets, wearable devices, or other portable WiFi equipped devices. A user may have indicated to the cloud computing system 100 that the WiFi devices 191 and 192 should be used to determine the presence in or absence from the environment 150 of users of the WiFi devices 191 and 192. The WiFi device 191 may be connected to the WiFi access point 171. The WiFi device 192 may be connected to the WiFi access point 172. The WiFi device 191 may move through the environment 150. As the WiFi device 191 moves away from the WiFi access point 171 and towards the WiFi access point 172, the WiFi device 191 may connect to the WiFi access point 172 and disconnect from the WiFi access point 171. The WiFi access point 171 may detect that the WiFi device 191 has disconnected after the WiFi device 191 has already connected to the WiFi access point 172. The WiFi device 191 may continue to move through the environment 150, away from the WiFi access point 172 and towards the WiFi access point 173. As the WiFi device 191 moves away from the WiFi access point 172 and towards the WiFi access point 173, the WiFi device 191 may connect to the WiFi access point 173 and disconnect from the WiFi access point 172. The WiFi access point 172 may detect that the WiFi device 191 has disconnected after the WiFi device 191 has already connected to the WiFi access point 173. The WiFi device 191 may continue to move away from the WiFi access point 173, disconnecting from the WiFi access point 173 and not connecting to either of the WiFi access points 171 and 172. While the WiFi device 191 moves, the WiFi device 192 may remain connected to the WiFi access point 172.

The WiFi access points 171, 172, and 173 may send reports to the cloud computing system 100. The reports may include times of connections to and disconnections from the WiFi access points 171, 172, and 173 by the WiFi devices in the environment 150, such as the WiFi devices 191 and 192. The reports may be sent at any suitable time or interval, or based on any suitable event. For example, the WiFi access points 171, 172, and 173 may send a new report anytime they detect a connection or disconnection of a WiFi device, or may send new reports at intervals of any suitable length. The reports may identify WiFi devices using a privacy preserving identifier, such as, for example, an SHMAC determined for the WiFi devices. For example, the WiFi access point 171 may send a report to the cloud computing system 100 at the time the WiFi device 191 initially connects to the WiFi access point 171. The report may include an SHMAC for the WiFi device 191, an identifier for the WiFi access point 171, an indication that a connection is being reported, and a time of the connection. The WiFi access point 171 may similarly send a report upon determining that the WiFi device 191 has disconnected from the WiFi access point 171. The WiFi access point 172 may send reports to the cloud computing system 100 that report the connection of the WiFi device 192, the connection of the WiFi device 191, and the subsequent disconnection of the WiFi device 191. The WiFi access point 173 may send reports to the cloud computing system 100 that report the connection of the WiFi device 191 and the subsequent disconnection of the WiFi device 191.

The cloud computing system 100 may include a report processor 110. The report processor 110 may be any suitable combination of hardware and software for receiving reports from WiFi access points, such as the WiFi access points 171, 172, and 173, and processing the reports to generate the connection sequences 145. The report processor 110 may receive the reports from the WiFi access points 171, 172, and 173 generated based on the connections and disconnections of the WiFi device 191 and the WiFi device 192. The report processor 110 may use the reports to generate and update connection sequences for the WiFi device 191 and the WiFi device 192. The connection sequence for a WiFi device may be updated each time a report regarding that WiFi device is received by the report processor 110. For example, on receiving a report indicating that the WiFi device 191 has connected to the WiFi access point 171, the report processor 110 may update the connection sequence for the WiFi device 191 by adding an indication of the connection to the WiFi access point 171 at the time indicated in the report. When the report processor 110 later receives a report from the WiFi access point 172 indicating a connection from the WiFi device 191, the report processor 110 may update the connection sequence for the WiFi device 191 by adding an indication of the connection to the WiFi access point 172 at the time indicated in the report. Disconnections may similarly be added to a connection sequence when reports of disconnections are received. The connection sequences 145 generated and updated by the report processor 110 may be stored in the storage 140 in any suitable format.

The cloud computing system 100 may include a rules engine 120. The rules engine 120 may be any suitable combination of hardware and software for applying rules to the connection sequences 145 to determine and output presence/absence indications that indicate whether a user should be considered present in or absent from the environment 150. If a WiFi device, such as the WiFi device 191, is connected to a single WiFi access point, such as the WiFi access point 171, in the environment 150 for a period of time that exceeds a first threshold period of time, the rules engine 120 may determine that a user associated with the WiFi device was present in the environment 150 during that period of time. If a WiFi device is not connected to a single WiFi access point in the environment 150 for a period of time that exceeds the first threshold period of time, the combined amount of time the WiFi device has been connected to any WiFi access point in the environment 150 may be determined. If the combined amount of time exceeds the first threshold period of time, the rules engine 120 may determine that a user associated with the WiFi device was present in the environment 150 during that period of time. If a WiFi device does not connect to any of the WiFi access points in the environment 150 for an amount of time that exceeds a second threshold period of time after disconnecting from one of the WiFi access points, then the rules engine 120 may determine that the user associated with the WiFi device is absent from the environment 150. The first and second threshold periods of time may any suitable lengths of time, determined in any suitable manner.

For example, the rules engine 120 may apply rules to the connection sequence for the WiFi device 191 at some point in time after the WiFi device 191 has connected to the WiFi access point 172 and disconnected from the WiFi access point 171. The amount of time the WiFi device 191 has been connected to the WiFi access point 172 may be less than the first threshold. The combined amount of time the WiFi device 191 has been connected to the WiFi access points 171 and 172 may be greater than the first threshold. For example, the first threshold may be five minutes, and the WiFi device 191 may have been connected to the WiFi access point 171 for two minutes and to the WiFi access point 172 for 3 and a half minutes at the time the rules engine 120 applies the rules to the connection sequence for the WiFi device 191. The rules engine 120 may therefore output an indication that a user of the WiFi device 191 is present in the environment 150. Similarly, the rules engine 120 may apply the rules to the connection sequence for the WiFi device 192 at the same time the rules are applied to the connection sequence for the WiFi device 191. The amount of time the WiFi device 192 has been connected to the WiFi access point 172 may be greater than the first threshold. The rules engine 120 may therefore output an indication that a user of the WiFi device 192 is present in the environment 150. Later, the rules engine 120 may apply the rules to the connection sequence for the WiFi device 191 after the WiFi device 191 has disconnected from the WiFi access point 173. If the WiFi device 191 has been disconnected from the WiFi access point 173 for a length of time greater than the second threshold, the rules engine 120 may output an indication that the user of the WiFi device 191 is absent from the environment 150. For example, the second threshold may be 3 minutes, and the WiFi device 191 may have been disconnected from the WiFi access point 173 without reconnecting to either the WiFi access points 171 or 172 for 4 minutes at the time the rules engine 120 applies the rules to the connection sequence for the WiFi device 191.

The presence/absence indications output by the rules engine 120 may be in any suitable format, and may use any suitable identifiers. For example, the cloud computing system 100 may only be aware of the SHMACs of the WiFi devices 191 and 192, and may not be aware of any identifying data for any users of the WiFi devices 191 and 192, or may be otherwise unable to correlate a specific user with a specific WiFi device. The presence/absence indications output by the rules engine 120 may include an SHMAC, with an indication of whether that SHMAC belongs to a WiFi device whose connection sequence indicates that a user of that WiFi device may be present in, or absent from, the environment 150. The presence/absence indications for different WiFi devices may be treated as if they are presence/absence indications for separate users. For example, a presence/absence indication for the WiFi device 191 may be treated as being a presence/absence indication for a user who is unique from the user of the WiFi device 192. In some implementations, the cloud computing system 100 may be able to associate an SHMAC with a specific user, for example, based on the user opting to allow their identity, or a privacy preserving identifier for the user, to be associated with the SHMAC. A single identified user may be associated with more then one SHMAC, so that presence/absence indications output by the rules engine 120 for SHMACs associated with the same user may be a aggregated to make a presence/absence determination for that user.

The rules engine 120 may apply the rules to the connection sequences 145 at any suitable times, for example, at any suitable intervals or based on any suitable events. For example, the rules engine 120 may apply the rules to the connection sequences 145 every 30 seconds, or based on an indication from another component of the cloud computing system 100 that a determination of users' presence in or absence from the environment 150 is needed, for example, to determine how to control various controllable devices in the environment 150.

FIG. 1B shows an example system suitable for determination of user presence and absence using WiFi connections according to an implementation of the disclosed subject matter. The WiFi access points in the environment 150, for example, the WiFi access points 171, 172, and 173, may send reports to the report processor 110 of the cloud computing system 100 for all WiFi devices that connect to and disconnect from the WiFi access points. For example, the WiFi access points 171, 172, and 173 may send reports to the cloud computing system 100 when any of the WiFi devices 191, 192, 491, and 492, connect to or disconnect from any of the WiFi access points 171, 172, or 173. The reports may identify the WiFi devices using privacy preserving identifiers, such as, for example, SHMACs.

The report processor 110 may process reports received from the WiFi access points in the environment 150 to generate, and update, data that may be stored as part of machine learning input data 445. The report processor 110 may, for example, use the reports to determine connection times 451, which may be the separate amounts of time the WiFi devices are connected to each WiFi access point in the environment 150, connects/disconnects 452, which may be counts of the number of times WiFi devices connect to and disconnect from WiFi access points in the environment 150 over a set period of time, connection/disconnection lengths 453, which may be the spans of time WiFi devices spend connected any WiFi access point in the environment 150 and the spans of time WiFi devices spend disconnected from any WiFi access point in the environment 150, and transitions 454, which may be the number of number of WiFi access points the WiFi devices connect to in a set time period and the number of transitions between WiFi access points made by the WiFi devices in that set time period.

The cloud computing system 100 may also receive device data directly from WiFi devices. For example, the cloud computing system 100 may receive geolocation data, and data determined using geolocation data, such as geofence crossings, directly from the WiFi devices 191, 192, 491, and 492. The data received directly from the WiFi devices may be stored in the machine learning input data 445 as WiFi device data 456. The cloud computing system 100 may also receive signals from the sensors and devices of the environment 150. The cloud computing system 100 may store the signals in the storage 140 as sensor and device data 455. The sensor and device data 455 may be stored as part of the machine learning input data 445.

The cloud computing system may include a machine learning system 420. The machine learning system 420 may be any suitable combination of hardware and software for implementing a machine learning system that may generate indications of WiFi devices to use to determine the presence in or absence from the environment 150 of users of the WiFi devices. The machine learning system 420 may be, for example, an artificial neural network such as a deep learning neural network, a Bayesian network, support vector machine, classifier of any type, or any other suitable statistical or heuristic machine learning system type. The machine learning system 420 may receive, as input, the machine learning input data 445, and may output indications of WiFi devices to use to determine the presence in or absence from the environment 150 of users of the WiFi devices. The machine learning system 420 may be implemented using any suitable type of learning, including, for example, supervised or unsupervised online learning or offline learning.

The machine learning input data 445 may be input to the machine learning system 420 in any suitable manner. For example, the machine learning input data 445 may be divided into sets of input data, with each separate set of input data including data regarding a separate WiFi device. A first set of input data may, for example, include data regarding the WiFi device 191, while a second set of input data may include data regarding the WiFi device 491. Each set of input data may be input to the machine learning system 420 separately. For example, the first set of input data, including data for the WiFi device 191, may be input to the machine learning system 420. The machine learning system 420 may output an indication of whether the WiFi device 191 should be used to determine the presence in or absence from the environment 150 of a user associated with the WiFi device 191. The indication may be, for example, a probability, or a binary result. All of the machine learning input data 445, including data for all WiFi devices for which reports were received such as the WiFi devices 191, 192, 491, and 492, may be input to the machine learning system 420 at the same time. The machine learning system 420 may output multiple indications, for example, one for each of the WiFi devices 191, 192, 491, and 492, indicating whether each WiFi device should be used to determine the presence in or absence from the environment 150 of a user associated with that WiFi device.

The indications of WiFi devices to use to determine the presence in or absence from the environment 150 of users associated with the WiFi devices may be based on, for example, correlations between the different types of data in the machine learning input data 445, and patterns in the data regarding connections to and disconnections from the WiFi access points of the environment 150. For example, the WiFi device 491 may be stationary, for example, a desktop computer or game console. The WiFi device 491 may have long connection times to the WiFi access point 171, but no disconnections or transitions, and its connections to the WiFi access point 171 may show no correlation to signals from sensors in the environment 150 that correspond to a user entering or leaving the environment 150, such as door opening/closing events. This may result in the machine learning system 420 outputting an indication that the WiFi device 491 should not be used to determine the presence in or absence from the environment 150 of any user. The indication may be, for example, a low probability, or a binary "no" indication. The WiFi device 492 may be mobile, for example, a phone that belongs to a user in the environment 150. The WiFi device 492 may have long connection and disconnection times to all of the WiFi access points 171, 173, and 173, may connect, disconnect, and transition frequently, and may have connections and disconnections that correspond to signals from entryway sensors showing doors to the environment 150 being opened and closed. Geolocation data from the WiFi device 492 may indicate that some disconnections of the WiFi device 492 from the WiFi access points correspond to geofence exit events for a geofence around the environment 150, and that some connections of the WiFi device 492 correspond to geofence entry events for the geofence around the environment 150. This may result in the machine learning system outputting an indication that the WiFi device 492 should be used to determine the presence in or absence from the environment 150 of a user associated with the WiFi device 492. This indication may be used by, for example, cloud computing system 100 when determining which of the connection sequences 145 to input to the rules engine 120.

The machine learning input data 445 may be continually updated as new data is received from, for example, the report processor 110, the signal receiver 410, and the WiFi devices. The updated machine learning input data 445 may be used as input to the machine learning system 420, which may generate new WiFi device indications.

The WiFi device indications output by the machine learning system 420 may be used in any suitable manner. The cloud computing system 100 may, for example, use the WiFi device indications to determine which of the connection sequences 145 the rules engine 120 should apply rules to in order to generate the presence/absence indications for the users in the environment 150. For example, if the WiFi device indications output by the machine learning system 420 indicate that the WiFi device 191 and the WiFi device 492 should be used to determine the presence in or absence from the environment 150 of their associated users, the rules engine 120 may apply the rules to connection sequences for the WiFi device 191 and the WiFi device 492. The rules engine 120 may not apply the rules to the connection sequences for the WiFi device 192 and the WiFi device 491, as these WiFi devices may not be useful as indicators of the presence in or absence from the environment 150 of their associated users. This may allow the rules engine 120 to generate useful presence/absence indications without requiring that a user explicitly tell the cloud computing system 100 which WiFi devices to use for this purpose.

Figure 2:
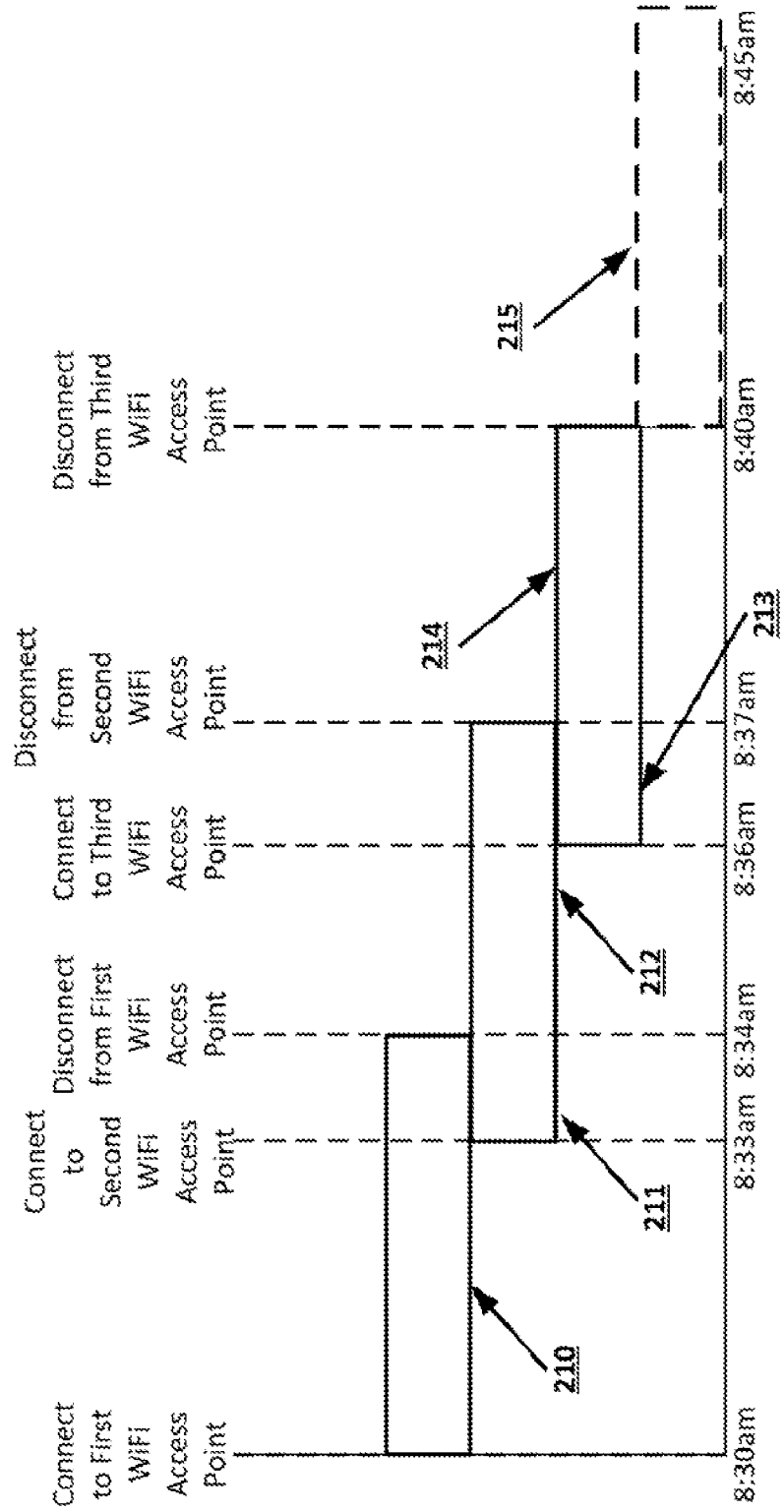
FIG. 2 shows an example time flow diagram suitable for determination of user presence and absence using WiFi connections according to an implementation of the disclosed subject matter.

FIG. 2 shows an example time flow diagram suitable for determination of user presence and absence using WiFi connections according to an implementation of the disclosed subject matter. The WiFi access point 171 may send a report to the report processor 110 indicating a connection from the WiFi device 191 occurred at 8:30 am. The WiFi access point 172 may send a report to the report processor 110 indicating a connection from the WiFi device 191 occurred at 8:33 am. The time period 210 may be the period of time the WiFi device 191 was connected to the WiFi access point 171 before connecting to the WiFi access point 172. The WiFi access point 171 may send a report to the report processor 110 indicating a disconnection of the WiFi device 191 occurred at 8:34 am. The time period 211 may be the period of time that the WiFi device 191 was connected to the WiFi access point 172 before the WiFi access point 171 determined that the WiFi device 191 had disconnected from it. The WiFi access point 173 may send a report to the report processor 110 indicating a connection from the WiFi device 191 occurred at 8:36 am. The time period 212 combined with the time period 211 may be the period of time the WiFi device 191 was connected to the WiFi access point 172 before connecting to the WiFi access point 173. The WiFi access point 172 may send a report to the report processor 110 indicating disconnection of the WiFi device 191 occurred at 8:37 am. The time period 213 may be the period of time that the WiFi device 191 was connected to the WiFi access point 173 before the WiFi access point 172 determined that the WiFi device 191 had disconnected from it. The WiFi access point 173 may send a report to the report processor 110 indicating disconnection of the WiFi device 191 occurred at 8:40 am. The time period 214 may be the period of time that the WiFi device 191 was connected to the WiFi access point 173 before the WiFi access point 173 determined that the WiFi device 191 had disconnected from it. The time period 215 may be the period of time the WiFi device 191 is disconnected from all of the WiFi access points in the environment 150. The most recent time period in a connection sequence, for example, the time period 215, may always be considered by the rules engine 120 to extend to the current time. For example, if there are no reports indicating that the WiFi device 191 has connected to any of the WiFi devices 171, 172, and 173 at 8:50 am, and the connection sequence for the WiFi device 191 is input to the rules engine 120 at 8:50 am, the time period 215 of disconnection may be extended to 8:50 am.

When determining indications for the presence in or absence from the environment 150 of users at a given time, the rules engine 120 may apply rules to the connection sequences 145 as of that time. For example, if the rules engine 120 determines presence/absence indications at 8:36 am, the rules engine 120 may test the time periods 210 and 211, and the part of the time period 212 between 8:34 am and 8:36 am, against the first and second thresholds of the rules. If the first threshold is five minutes, the rules engine 120 may determine that the connection sequence for the WiFi device 191 indicates the presence of a user, as the WiFi device 191 was connected to the WiFi access points 171 and 172 for a combined six minutes across the time period 210, the time period 211, and the first two minutes of the time period 212. If the rules engine 120 determines presence/absence indications at 8:45 am, the rules engine 120 may test the time period 215 against the second threshold. If the second threshold is four minutes, the rules engine 120 may determine that the connection sequence for the WiFi device 191 indicates the absence of a user, as the WiFi device 191 has been disconnected from all WiFi access points for five minutes. If the second threshold is six minutes, the rules engine 120 may then test the time periods 210, 211, 212, 213, and 214 against the first threshold, and may determine that the connection sequence for the WiFi device 191 indicates the presence of a user, as the WiFi device 191 was connected to the WiFi access points 171, 172, and 173 for a combined ten minutes across the time periods 210, 211, 212, 213, and 214. The second threshold may thus act as delay period for determining the absence of a user based on the disconnection of a WiFi device.

Figure 3:
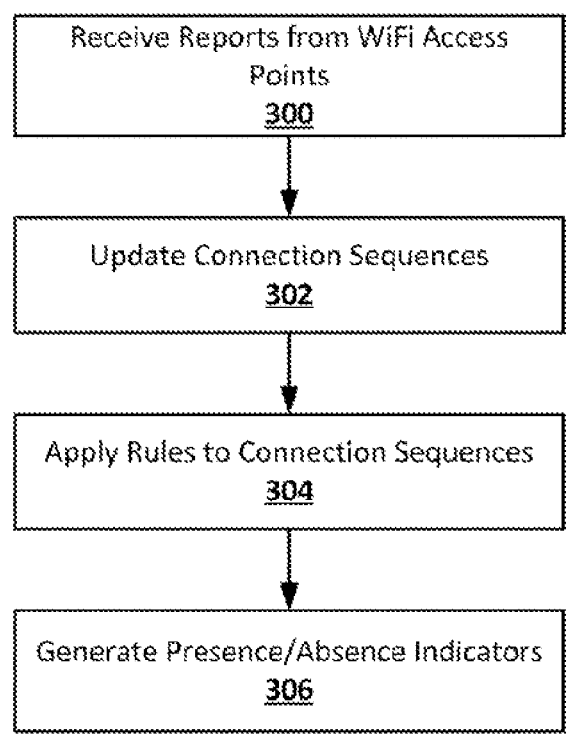
FIG. 3 shows an example process suitable for determination of user presence and absence using WiFi connections according to an implementation of the disclosed subject matter.

FIG. 3 shows an example of a process suitable for determination of user presence and absence using WiFi connections according to an implementation of the disclosed subject matter. At 300, reports regarding the connection to and disconnection from WiFi access points in an environment by WiFi devices may be received at a cloud computing system from the WiFi access points.

At 302, connection sequences may be updated using connection and disconnection times for the WiFi devices in the reports received from the WiFi access points in the environment.

At 304, rules may be applied to the connection sequences to determine time periods during which WiFi devices were present in or absent from the environment based on the time periods WiFi devices were connected to or disconnected from the WiFi access points in the environment.

At 306, presence and absence indications for users may be generated based on the determinations of presence or absence for the WiFi devices.

Figure 4:
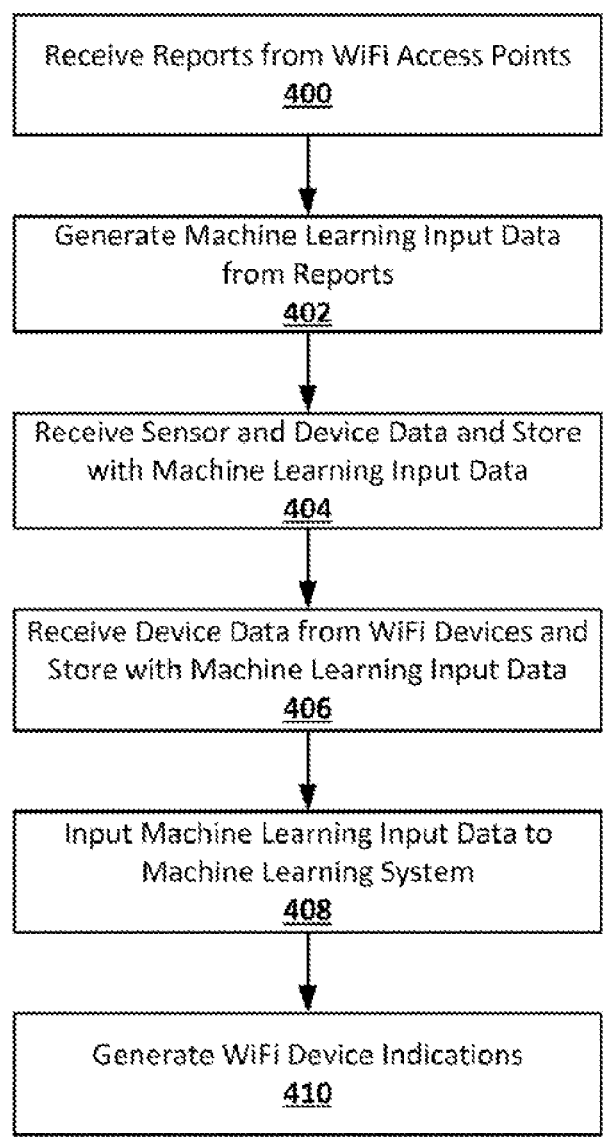
FIG. 4 shows an example process suitable for determination of user presence and absence using WiFi connections according to an implementation of the disclosed subject matter.

FIG. 4 shows an example of a process suitable for determination of user presence and absence using WiFi connections according to an implementation of the disclosed subject matter. At 400, reports regarding the connection to and disconnection from WiFi access points in an environment by WiFi devices may be received at a cloud computing system from the WiFi access points.

At 402, machine learning input data may be generated from the reports, including connection time data, connects/disconnects count data, connection/disconnection length data, and transition data.

At 404, sensor and device data may be received at the cloud computing system and stored with the machine learning input data.

At 406, device data may be received directly from WiFi devices, including geolocation data and geofence entry and exit data, and stored with the machine learning input data.

At 408, the machine learning input data may be input to a machine learning system.

At 410, WiFi device indications may be generated by the machine learning system indicating which WiFi devices should be used to determine users' presence in or absence from the environment.

Figure 5:
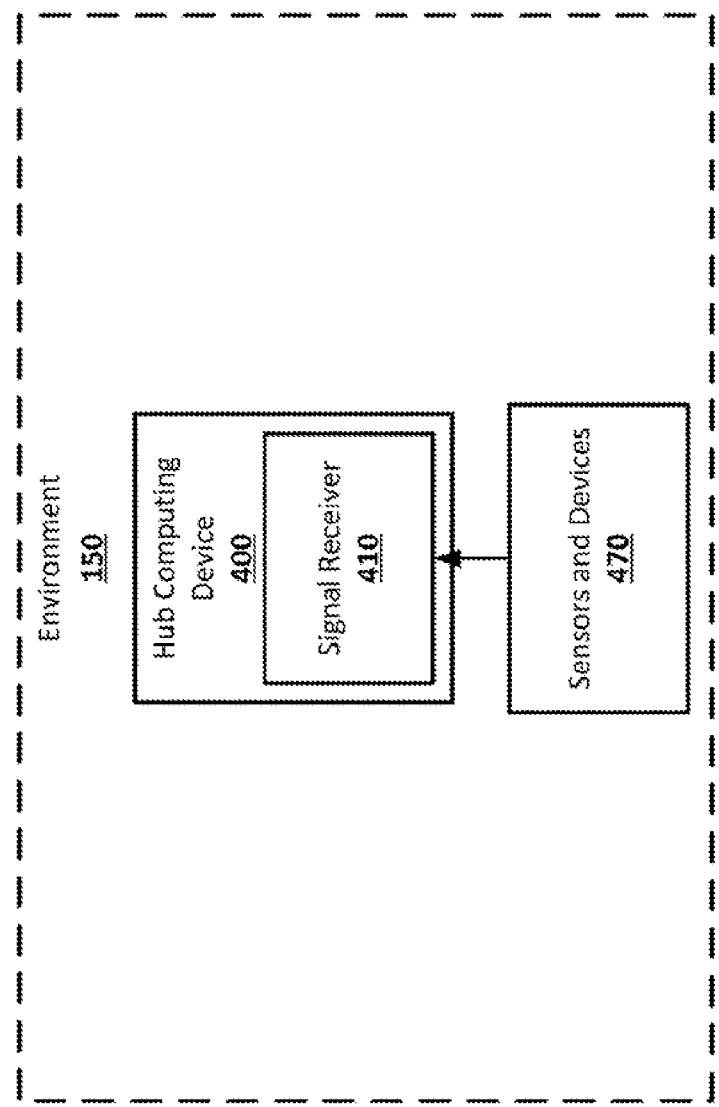
FIG. 5 shows an example system and arrangement suitable for determination of user presence and absence using WiFi connections according to an implementation of the disclosed subject matter.

FIG. 5 shows an example system suitable for determination of user presence and absence using WiFi connections according to an implementation of the disclosed subject matter. A hub computing device 400 may include a signal receiver 410. The hub computing device 400 may be any suitable device, such as, for example, a computer 20 as described in FIG. 9, for implementing the signal receiver 410. The hub computing device 400 may be, for example, a controller 73 as described in FIG. 7. The hub computing device 400 may be a single computing device, or may include multiple connected computing devices, and may be, for example, a thermostat, other sensor, phone, tablet, laptop, desktop, television, watch, or other computing device that may act as a hub for the environment 150, which may include a security system and automation functions.

The environment 150 may be controlled from the hub computing device 400. The hub computing device 400 may be connected to various sensors throughout an environment as well as to various systems within the environment 150, such as HVAC systems. The hub computing device 400 may include any suitable hardware and software interfaces through which a user may interact with the hub computing device 400. The hub computing device 400 may be located within the environment 150, may be located offsite, or may include computation devices both in the environment 150 and offsite. An onsite hub computing device 400 may use computation resources from other computing devices throughout the environment 150 or connected remotely, such as, for example, as part of a cloud computing platform.

The signal receiver 410 may be any suitable combination of hardware or software for receiving signals generated by sensors and other electronic devices that may be part of the environment 150 and may be connected to the hub computing device 400. For example, the signal receiver 410 may receive signals from the sensors and devices 470 that may be distributed throughout the environment 150. The sensors and devices 470 may be, for example, any combination of motion sensors, entryway sensors, cameras, microphones, light sensors, contact sensors, tilt sensors, WiFi or Bluetooth detectors, lights, appliances, A/V equipment, HVAC systems, security systems, or any other suitable sensor and device types in the environment 150. The signals received by the signal receiver 410 from the sensors and devices 470 may include, for example, open/close events detected by sensors that monitor external doors of the environment and motions detected by motion sensors that monitor areas around the external doors of the environment 150, data indicating when devices, including lights, appliances, and A/V equipment, have been turned on or off based on input from a user, rather than through automated control by the hub computing device 400 or cloud computing system 100, and any other suitable data that may be indicative of whether a user is present in, absent from, entering, or leaving, the environment 150. The signals may include, for example, signals and other data generated by the sensors and devices 470 based on active output from the sensors or lack out active output from the sensors. For example, a motion sensor may generate active output when it detects motion, and may have a lack of active output when it does not detect motion.

The signal receiver 410 may transmit signals received from the sensors and devices 470 of the environment 150 to the cloud computing system 100. The cloud computing system 100 may store the signals in the storage 140 as sensor and device data 455. The sensor and device data 455 may be stored as part of machine learning input data 445.

In some implementations, the machine learning system 420 may be run on the hub computing device 400. The machine learning input data 445 may be stored in a storage of the hub computing device 400 instead of the storage 140 of the cloud computing system 100, or the storage 140 may be accessible to the hub computing device 400. If the machine learning input data 445 is stored on the hub computing device 400, the hub computing device 400 may receive the reports from the WiFi access points of the environment 150 and the device data from the WiFi devices, and may include a report processor similar to the report processor 110 to generate the connection times 451, connects/disconnects 452, connection/disconnection lengths 453, and transitions 454 from the reports. The WiFi device indications output by the machine learning system 420 may be transmitted to the cloud computing system 100 or may be used by the hub computing device 400 to control which reports are sent to the cloud computing system 100. For example, the hub computing device 400 may cause only reports for WiFi devices that the WiFi device indications indicate should be used to determine users' presence in or absence from the environment to be sent to the cloud computing system 100.

Reports may be received from WiFi access points in an environment. The reports may include an identifier of a WiFi device, an indication of a connection to or disconnection from one of the WiFi access points, a time of the connection or disconnection, and an identifier of the one of the WiFi access points. A connection sequence for the WiFi device may be generated from the reports. The connection sequence may include times of connections to and times of disconnections from the WiFi access points by the WiFi device. Whether the WiFi device is present in the environment or absent from the environment as of a specified time may be determined based on time periods of connection to any of the WiFi access points and time periods of disconnection from all of the WiFi access points in the connection sequence. An indication of presence for a user associated with the WiFi device may be generated if it is determined that the WiFi device is present in the environment or an indication of absence may be generated for the user associated with the WiFi device if it is determined that the WiFi device is absent from the environment.

A control signal may be generated for a controllable device in the environment based on the indication of presence or the indication absence. The control signal may be sent to the device to be implemented by the device.

Whether the WiFi device is present in the environment or absent from the environment as of a specified time may be determined based on time periods of connection to the WiFi access points and time periods of disconnection from the WiFi access points in the connection sequence by determining that the WiFi device is present in the environment if the amount of time between the start of one of the time periods of connection to any of the WiFi access points and the specified time is greater than a first threshold amount of time and the one of the time periods of connection includes the specified time, or if a total amount of time between the start of a first of two or more consecutive time periods of connection to any of the WiFi access points and the specified time is greater than the first threshold and a last of the two or more consecutive time periods includes the specified time.

Whether the WiFi device is present in the environment or absent from the environment as of a specified time may be determined based on time periods of connection to the WiFi access points and time periods of disconnection from the WiFi access points in the connection sequence by determining that the WiFi device is absent from the environment if an amount of time between the start of one of the time periods of disconnection from all of the WiFi access points is greater than a second threshold amount of time and the one of the time periods of disconnection includes the specified time.

The identifier of the WiFi device may be a salted hashed media access control address (SHMAC).

Before whether the WiFi device is present in the environment or absent from the environment as of a specified time is determined based on time periods of connection to any of the WiFi access points and time periods of disconnection from all of the WiFi access points in the connection sequence, a connection time data, connects/disconnects count data, transition data, and connection/disconnection length data for the WiFi device may be generated from the reports, sensor and device data may be received from sensors or devices in the environment, and a WiFi device indication indicating that the WiFi device should be used to determine the presence in or absence from the environment of the user associated with the WiFi device may be generated with a machine learning system, where the connection time data, the connects/disconnects count data, the transition data, and the connection/disconnection length data for the WiFi device and the sensor and device data are input to the machine learning system.

Additional reports may be received from the WiFi access points in the environment. The additional reports may include an identifier of a second WiFi device, an indication of a connection to or disconnection from one of the WiFi access points, a time of the connection or disconnection, and an identifier of the one of the WiFi access points. Second connection time data, second connects/disconnects count data, second transition data, and second connection/disconnection length data for the second WiFi device may be generated from the additional reports. A second WiFi device indication indicating that the second WiFi device should not be used to determine the presence in or absence from the environment of a second user associated with the second WiFi device may generated with the machine learning system, where second connection time data, the second connects/disconnects count data, the second transition data, and the second connection/disconnection length data for the second WiFi device and the sensor and device data are input to the machine learning system.

Device data may be received from the WiFi device. The device data may be input to the machine learning system.

The device data may include geolocation data for the WiFi device and/or geofence data for the WiFi device.

A system may include WiFi access points in an environment and a computing device of a cloud computing system that receives, from the WiFi access points in the environment, reports, where each of the reports includes an identifier of a WiFi device, an indication of a connection to or disconnection from one of the WiFi access points, a time of the connection or disconnection, and an identifier of the one of the WiFi access points, generates, from the reports, a connection sequence for the WiFi device, wherein the connection sequence includes times of connections to and times of disconnections from the WiFi access points by the WiFi device, determines, based on time periods of connection to any of the WiFi access points and time periods of disconnection from all of the WiFi access points in the connection sequence, whether the WiFi device is present in the environment or absent from the environment as of a specified time, and generates an indication of presence for a user associated with the WiFi device if it is determined that the WiFi device is present in the environment or generating an indication of absence for the user associated with the WiFi device if it is determined that the WiFi device is absent from the environment.

The computing device of the cloud computing system may generate a control signal for a controllable device in the environment based on the indication of presence or the indication absence and sends the control signal to the device to be implemented by the device.

The computing device of the cloud computing system may determine, based on time periods of connection to the WiFi access points and time periods of disconnection from the WiFi access points in the connection sequence, whether the WiFi device is present in the environment or absent from the environment as of a specified time, by determining that the WiFi device is present in the environment if the amount of time between the start of one of the time periods of connection to any of the WiFi access points and the specified time is greater than a first threshold amount of time and the one of the time periods of connection includes the specified time, or if a total amount of time between the start of a first of two or more consecutive time periods of connection to any of the WiFi access points and the specified time is greater than the first threshold and a last of the two or more consecutive time periods includes the specified time.

The computing device of the cloud computing system may determine based on time periods of connection to the WiFi access points and time periods of disconnection from the WiFi access points in the connection sequence, whether the WiFi device is present in the environment or absent from the environment as of a specified time, by determining that the WiFi device is absent from the environment if an amount of time between the start of one of the time periods of disconnection from all of the WiFi access points is greater than a second threshold amount of time and the one of the time periods of disconnection includes the specified time.

The identifier of the WiFi device may include a salted hashed media access control address (SHMAC).

The computing device of the cloud computing system may, before determining, based on time periods of connection to any of the WiFi access points and time periods of disconnection from all of the WiFi access points in the connection sequence, whether the WiFi device is present in the environment or absent from the environment as of a specified time, generate, from the reports, a connection time data, connects/disconnects count data, transition data, and connection/disconnection length data for the WiFi device, receive, from sensors or devices in the environment, sensor and device data, and generate, with a machine learning system, a WiFi device indication indicating that the WiFi device should be used to determine the presence in or absence from the environment of the user associated with the WiFi device, where the connection time data, the connects/disconnects count data, the transition data, and the connection/disconnection length data for the WiFi device and the sensor and device data may be input to the machine learning system.

The computing device of the cloud computing system may receive, from the WiFi access points in the environment, additional reports, where each of the additional reports may include an identifier of a second WiFi device, an indication of a connection to or disconnection from one of the WiFi access points, a time of the connection or disconnection, and an identifier of the one of the WiFi access points, may generate, from the additional reports, second connection time data, second connects/disconnects count data, second transition data, and second connection/disconnection length data for the second WiFi device, and may generate, with the machine learning system, a second WiFi device indication indicating that the second WiFi device should not be used to determine the presence in or absence from the environment of a second user associated with the second WiFi device, where the second connection time data, the second connects/disconnects count data, the second transition data, and the second connection/disconnection length data for the second WiFi device and the sensor and device data may be input to the machine learning system.

The computing device of the cloud computing system may receive device data from the WiFi device. The device data may be input to the machine learning system.

The device data may include geolocation data for the WiFi device and geofence data for the WiFi device.

A means for receiving, from WiFi access points in an environment, reports, wherein each of the reports includes an identifier of a WiFi device, an indication of a connection to or disconnection from one of the WiFi access points, a time of the connection or disconnection, and an identifier of the one of the WiFi access points, a means for generating, from the reports, a connection sequence for the WiFi device, wherein the connection sequence includes times of connections to and times of disconnections from the WiFi access points by the WiFi device, a means for determining, based on time periods of connection to any of the WiFi access points and time periods of disconnection from all of the WiFi access points in the connection sequence, whether the WiFi device is present in the environment or absent from the environment as of a specified time, a means for generating an indication of presence for a user associated with the WiFi device if it is determined that the WiFi device is present in the environment or generating an indication of absence for the user associated with the WiFi device if it is determined that the WiFi device is absent from the environment, a means for generating a control signal for a controllable device in the environment based on the indication of presence or the indication absence, a means for sending the control signal to the device to be implemented by the device, a means for determining that the WiFi device is present in the environment if the amount of time between the start of one of the time periods of connection to any of the WiFi access points and the specified time is greater than a first threshold amount of time and the one of the time periods of connection includes the specified time, or if a total amount of time between the start of a first of two or more consecutive time periods of connection to any of the WiFi access points and the specified time is greater than the first threshold and a last of the two or more consecutive time periods includes the specified time, a means for determining that the WiFi device is absent from the environment if an amount of time between the start of one of the time periods of disconnection from all of the WiFi access points is greater than a second threshold amount of time and the one of the time periods of disconnection includes the specified time, a means for generating, from the reports, a connection time data, connects/disconnects count data, transition data, and connection/disconnection length data for the WiFi device, a means for receiving, from one or more sensors or devices in the environment, sensor and device data, a means for generating, with a machine learning system, a WiFi device indication indicating that the WiFi device should be used to determine the presence in or absence from the environment of the user associated with the WiFi device, wherein the connection time data, the connects/disconnects count data, the transition data, and the connection/disconnection length data for the WiFi device and the sensor and device data are input to the machine learning system, a means for receiving, from the WiFi access points in the environment, additional reports, wherein each of the additional reports includes an identifier of a second WiFi device, an indication of a connection to or disconnection from one of the WiFi access points, a time of the connection or disconnection, and an identifier of the one of the WiFi access points, a means for generating, from the additional reports, second connection time data, second connects/disconnects count data, second transition data, and second connection/disconnection length data for the second WiFi device, a means for generating, with the machine learning system, a second WiFi device indication indicating that the second WiFi device should not be used to determine the presence in or absence from the environment of a second user associated with the second WiFi device, wherein the second connection time data, the second connects/disconnects count data, the second transition data, and the second connection/disconnection length data for the second WiFi device and the sensor and device data are input to the machine learning system, and a means for receiving device data from the WiFi device, wherein the device data is input to the machine learning system, are included.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 6:
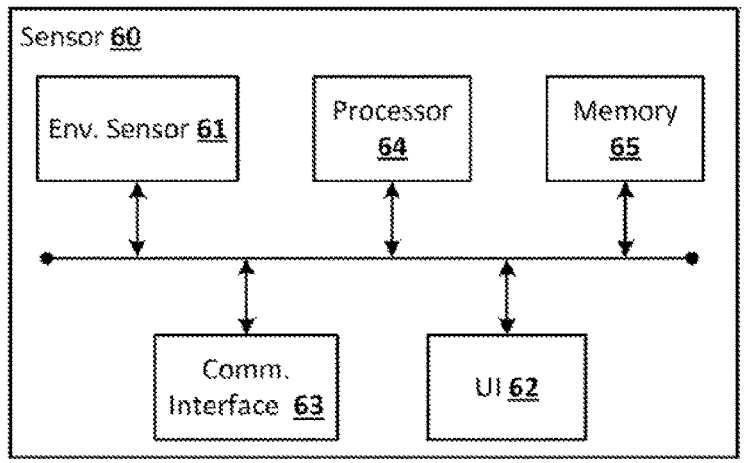
FIG. 6 shows a computing device according to an embodiment of the disclosed subject matter.

A sensor may include hardware in addition to the specific physical sensor that obtains information about the environment. FIG. 6 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 7:
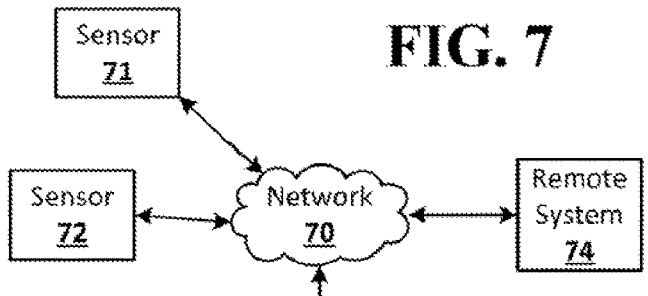
FIG. 7 shows a system according to an embodiment of the disclosed subject matter.
Figure 8:
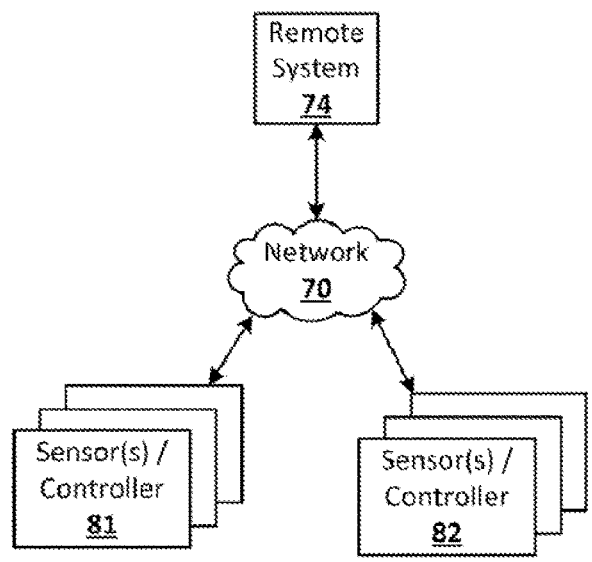
FIG. 8 shows a system according to an embodiment of the disclosed subject matter.

FIG. 7 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 400 may be an example of a controller 73 and the sensors 210 may be examples of sensors 71 and 72, as shown and described in further detail with respect to FIGS. 1-10.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 40, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 7 may be an example of a smart-home environment. The depicted smart-home environment may include a structure, a house, office building, garage, mobile home, or the like. The devices of the smart environment, such as the sensors 71, 72, the controller 73, and the network 70 may be integrated into a smart-home environment that does not include an entire structure, such as an apartment, condominium, or office space.

The smart environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 7 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 7.

According to embodiments of the disclosed subject matter, the smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 7, and the controller 73 may control the HVAC system (not shown) of the structure.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 7, and the controller 73 may control an alarm system to provide a visual and/or audible alarm to the user of the smart-home environment.

A smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 7 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 7. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan. For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 7 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 7 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment (e.g., as illustrated as sensors 71, 72 of FIG. 7 can be communicatively coupled to each other via the network 70, and to the controller 73 and/or remote system 74 to provide security, safety, and/or comfort for the smart environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOB s with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected smart devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 8 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 9:
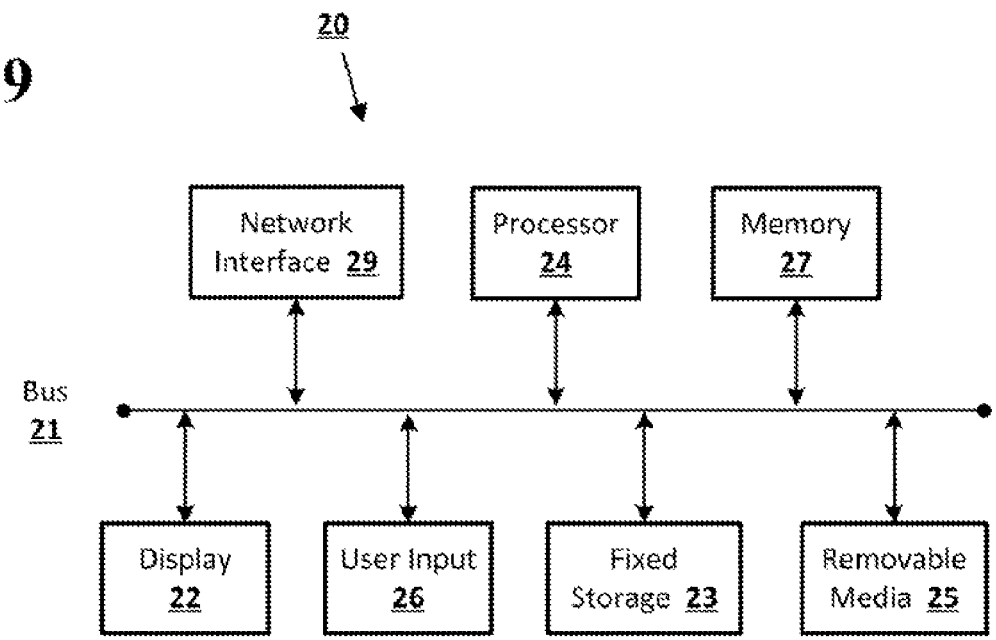
FIG. 9 shows a computer according to an embodiment of the disclosed subject matter.

Embodiments of the presently disclosed subject matter may be implemented in and used with a variety of computing devices. FIG. 9 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 10:
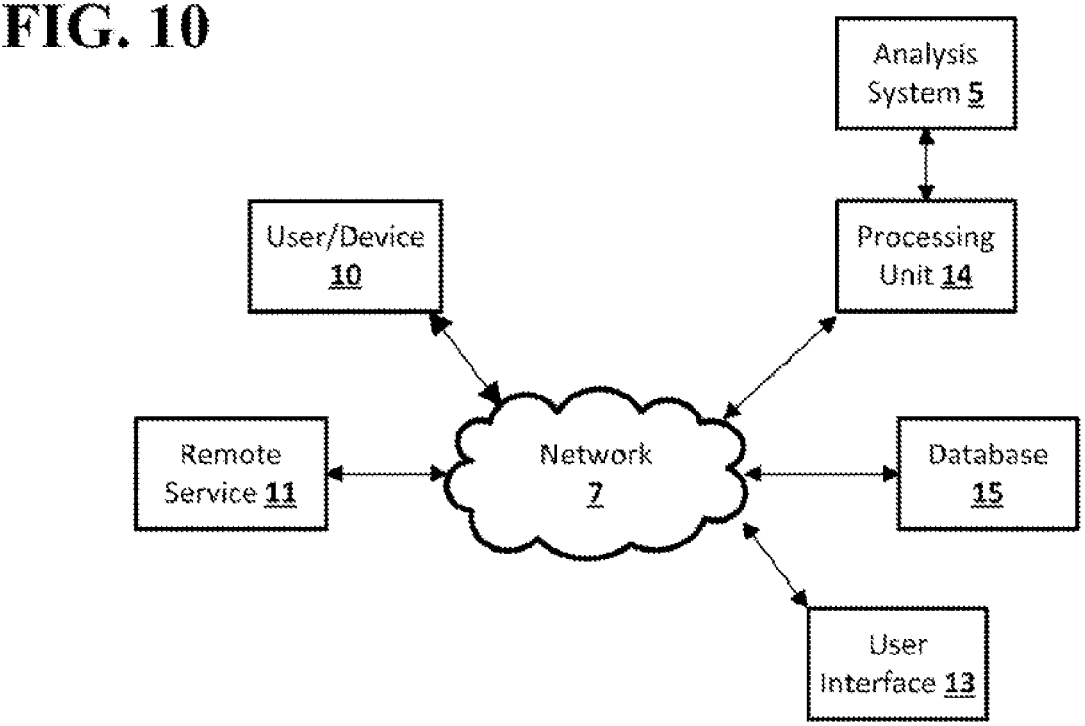
FIG. 10 shows a network configuration according to an embodiment of the disclosed subject matter.

FIG. 10 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving, from wireless access points in an environment, data that provides an indication of a connection to or disconnection from one of the wireless access points by a device, and a time of the connection or disconnection;
   generating, from the data, a connection sequence for the device, wherein the connection sequence indicates one or more times of connection to the wireless access points by the device, or times of disconnection from the wireless access points by the device; and
   determining based at least in part on the connection sequence for the device that the device is present in the environment or absent from the environment as of a specified time.

2. The computer-implemented method of claim 1, further comprising:
   generating an indication of presence for a user associated with the device if it is determined that the device is present in the environment or generating an indication of absence for the user associated with the device if it is determined that the device is absent from the environment;
   generating a control signal for a controllable device in the environment based on the indication of presence or the indication of absence; and
   sending the control signal to the device to be implemented by the device.

3. The computer-implemented method of claim 1, wherein determining based on the connection sequence for the device that the device is present in the environment or absent from the environment as of a specified time, further comprises:
   determining that the device is present in the environment if an amount of time between a start of a one time period of connection to any of the wireless access points and the specified time is greater than a first threshold amount of time and the one time period of connection comprises the specified time, or if a total amount of time between a start of a first of two or more consecutive time periods of connection to any of the wireless access points and the specified time is greater than the first threshold amount of time and a last of the two or more consecutive time periods comprises the specified time.

4. The computer-implemented method of claim 1, wherein determining based on the connection sequence for the device that the device is present in the environment or absent from the environment as of a specified time further comprises:
   determining that the device is absent from the environment if an amount of time between a start of a one time period of disconnection from all of the wireless access points is greater than a second threshold amount of time and the one of the time periods of disconnection includes the specified time.

5. The computer-implemented method of claim 1, further comprising receiving, from the wireless access points in the environment, additional data, wherein the additional data comprises an identifier of the device, wherein the data comprises an identifier of the device, wherein the identifier of the device comprises a salted hashed media access control address (SHMAC).

6. The computer-implemented method of claim 1, further comprising, before determining, determining based on the connection sequence for the device that the device is present in the environment or absent from the environment as of a specified time:
   generating, from the data, a connection time data, connects/disconnects count data, transition data, and connection/disconnection length data for the device;
   receiving, from one or more sensors or devices in the environment, sensor and device data; and
   generating, with a machine learning system, a device indication indicating that the device should be used to determine a presence in or absence from the environment of a user associated with the device, wherein the connection time data, the connects/disconnects count data, the transition data, and the connection/disconnection length data for the device and the sensor and device data are input to the machine learning system.

7. The computer-implemented method of claim 6, further comprising:
   receiving, from the wireless access points in the environment, additional data, wherein the additional data comprises an identifier of a second device, an indication of a connection to or disconnection from one of the wireless access points, a time of the connection or disconnection, and an identifier of the one of the wireless access points;
   generating, from the additional data, second connection time data, second connects/disconnects count data, second transition data, and second connection/disconnection length data for the second device; and
   generating, with the machine learning system, a second device indication indicating that the second device should not be used to determine the presence in or absence from the environment of a second user associated with the second device, wherein the second connection time data, the second connects/disconnects count data, the second transition data, and the second connection/disconnection length data for the second device and the sensor and device data are input to the machine learning system.

8. The computer-implemented method of claim 6, further comprising receiving device data from the device, wherein the device data is input to the machine learning system.

9. The computer-implemented method of claim 8, wherein the device data comprises at least one of geolocation data for the device and geofence data for the device.

10. A computer-implemented system for determination of user presence and absence using wireless connections comprising:
a computing device of a cloud computing system that receives from wireless access points in an environment, data, wherein the data comprises an indication of a connection to or disconnection from one of the wireless access points by a device, and a time of the connection or disconnection;
generating, from the data, a connection sequence for the device, wherein the connection sequence comprises one or more of times of connections to the wireless access points by the device, or times of disconnections from the wireless access points by the device; and
determining, based on the connection sequence for the device, that the device is present in the environment or absent from the environment as of a specified time.

11. The computer-implemented system of claim 10, wherein the computing device of the cloud computing system generates an indication of presence for a user associated with the device if it is determined that the device is present in the environment or generating an indication of absence for the user associated with the device if it is determined that the device is absent from the environment, generates a control signal for a controllable device in the environment based on the indication of presence or the indication of absence, and sends the control signal to the device to be implemented by the device.

12. The computer-implemented system of claim 10, wherein the computing device of the cloud computing system determines, based on the connection sequence for the device, that the device is present in the environment or absent from the environment as of a specified time by determining that the device is present in the environment if an amount of time between a start of a one time period of connection to any of the wireless access points and the specified time is greater than a first threshold amount of time and the one time period of connection comprises the specified time, or if a total amount of time between the start of a first of two or more consecutive time periods of connection to any of the wireless access points and the specified time is greater than the first threshold amount of time and a last of the two or more consecutive time periods comprises the specified time.

13. The computer-implemented system of claim 10, wherein the computing device of the cloud computing system determines, based on the connection sequence for the device that the device is present in the environment or absent from the environment as of a specified time by determining that the device is absent from the environment if an amount of time between a start of one time period of disconnection from all of the wireless access points is greater than a second threshold amount of time and the one of the time periods of disconnection includes the specified time.

14. The computer-implemented system of claim 10, wherein the computing device of the cloud computing system further receives from the wireless access points, additional data that includes an identifier of the device that comprises a salted hashed media access control address (SHMAC).

15. The computer-implemented system of claim 10, wherein the computing device of the cloud computing system determines, before determining, based on the connection sequence for the device that the device is present in the environment or absent from the environment as of a specified time whether the device is present in the environment or absent from the environment as of a specified time, generates, from the data, a connection time data, connects/disconnects count data, transition data, and connection/disconnection length data for the device, receives, from one or more sensors or devices in the environment, sensor and device data, and generates, with a machine learning system, a device indication indicating that the device should be used to determine the presence in or absence from the environment of a user associated with the device, wherein the connection time data, the connects/disconnects count data, the transition data, and the connection/disconnection length data for the device and the sensor and device data are input to the machine learning system.

16. The computer-implemented system of claim 15, wherein the computing device of the cloud computing system further receives, from the wireless access points in the environment, additional reports, wherein each of the additional reports comprises an identifier of a second device, an indication of a connection to or disconnection from one of the wireless access points, a time of the connection or disconnection, and an identifier of the one of the wireless access points, and generates, from the additional reports, second connection time data, second connects/disconnects count data, second transition data, and second connection/disconnection length data for the second device, and generates, with the machine learning system, a second device indication indicating that the second device should not be used to determine the presence in or absence from the environment of a second user associated with the second device, wherein the second connection time data, the second connects/disconnects count data, the second transition data, and the second connection/disconnection length data for the second device and the sensor and device data are input to the machine learning system.

17. The computer-implemented system of claim 15, wherein the computing device of the cloud computing system further receives device data from the device, wherein the device data is input to the machine learning system.

18. The computer-implemented system of claim 17, wherein the device data comprises at least one of geolocation data for the device and geofence data for the device.

19. A system comprising: one or more computers and one or more storage devices storing instructions which are operable, when executed by the one or more computers, to cause the one or more computers to perform operations comprising:
receiving, from one or more wireless access points in an environment, data, that provides an indication of a connection to or disconnection from one of the wireless access points by a device, and a time of the connection or disconnection;
generating, from the data, a connection sequence for the device, wherein the connection sequence comprises one or more of times of connections to the one or more wireless access points by the device and times of disconnections from the one or more wireless access points by the device; and determining based on the connection sequence for the device that the device is present in the environment or absent from the environment as of a specified time.

20. The system of claim 19, wherein the instructions further cause the one or more computers to perform operations comprising, before determining, based on time periods of connection to any of the one or more wireless access points and time periods of disconnection from all of the one or more wireless access points in the connection sequence, that the device is present in the environment or absent from the environment as of a specified time:
- generating, from the data, a connection time data, connects/disconnects count data, transition data, and connection/disconnection length data for the device;
- receiving, from one or more sensors or devices in the environment, sensor and device data; and
- generating, with a machine learning system, a device indication indicating that the device should be used to determine a presence in or absence from the environment of a user associated with the device, wherein the connection time data, the connects/disconnects count data, the transition data, and the connection/disconnection length data for the device and the sensor and device data are input to the machine learning system.

\* \* \* \* \*